(12) United States Patent
Thomas et al.

(10) Patent No.: US 9,920,230 B2
(45) Date of Patent: *Mar. 20, 2018

(54) USE OF LOW GWP REFRIGERANTS COMPRISING $CF_3I$ WITH STABLE LUBRICANTS

(75) Inventors: Raymond H. Thomas, Pendleton, NY (US); Rajiv R. Singh, Getzville, NY (US); George J. Samuels, Williamsville, NY (US); Ian Shankland, Randolph, NJ (US); David P. Wilson, East Amherst, NY (US); Roy P. Robinson, Holland, NY (US); Michael Van Der Puy, Amherst, NY (US); John L. Welch, Williamsville, NY (US); Gregory J. Shafer, Bear, DE (US); Mark W. Spatz, East Amherst, NY (US); Ryan Hulse, Getzville, NY (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/022,902

(22) Filed: Feb. 8, 2011

(65) Prior Publication Data

US 2011/0126558 A1 Jun. 2, 2011

Related U.S. Application Data

(63) Continuation of application No. 11/937,267, filed on Nov. 8, 2007, now abandoned, and a
(Continued)

(51) Int. Cl.
C09K 5/04 (2006.01)

(52) U.S. Cl.
CPC ........ C09K 5/045 (2013.01); *C09K 2205/122* (2013.01); *C10N 2240/30* (2013.01)

(58) Field of Classification Search
CPC ................ C09K 5/044; C09K 2205/22; C09K 2205/126
See application file for complete search history.

(56) References Cited

U.S. PATENT DOCUMENTS

| 2,834,748 A | 5/1958 | Bailey et al. |
| 2,846,458 A | 8/1958 | Haluska |

(Continued)

FOREIGN PATENT DOCUMENTS

| DE | 4116274 | 11/1992 |
| EP | 0377122 | 7/1990 |

(Continued)

OTHER PUBLICATIONS

International Search Report, PCT/US05/046982, dated Dec. 20, 2006. WO.

(Continued)

*Primary Examiner* — John R Hardee
(74) *Attorney, Agent, or Firm* — Colleen D. Szuch

(57) ABSTRACT

The invention pertains to heat transfer compositions, particularly to automobile refrigerants comprising a hydrofluoroalkene, an iodocarbon, and at least one lubricant having hydrogen atoms and carbon atoms, wherein no more than 17% of the total number of hydrogen atoms which are attached to a carbon atom are tertiary hydrogen atoms.

18 Claims, 1 Drawing Sheet

Capped EO/PO

- Lubricant
  - Methyl capped EO/PO
  - Ethyl capped EO/PO
- Additive
  - 0.75% Farnesene
  - 0.75% DP213
- Time of exposure
  - 3 days
- Conclusion so far
  - More stable than monocapped EO/PO version
  - Methyl less stable than ethyl
    - Might imply that larger caps provide more stability even for PO PAGs
  - Impurity affecting stability of methyl?

Related U.S. Application Data continuation-in-part of application No. 11/795,779, filed as application No. PCT/US2005/046982 on Dec. 21, 2005.

(60) Provisional application No. 60/865,659, filed on Nov. 14, 2006, provisional application No. 60/638,003, filed on Dec. 21, 2004.

(56) References Cited

U.S. PATENT DOCUMENTS

| | | |
|---|---|---|
| 2,889,379 A | 6/1959 | Ruh et al. |
| 2,917,480 A | 12/1959 | Bailey et al. |
| 3,085,918 A | 4/1963 | Sherliker |
| 4,465,786 A | 8/1984 | Zimmer et al. |
| 4,755,316 A | 7/1988 | Magid et al. |
| 4,798,818 A | 1/1989 | Baizer et al. |
| 5,380,449 A | 1/1995 | Thomas et al. |
| 5,716,549 A | 2/1998 | Nimitz |
| 5,744,052 A | 4/1998 | Bivens |
| 6,086,782 A | 7/2000 | Hsu et al. |
| 6,100,230 A | 8/2000 | Bement |
| 6,183,661 B1 | 2/2001 | Makin |
| 6,516,837 B2 | 2/2003 | Thomas et al. |
| 6,589,355 B1 | 7/2003 | Thomas |
| 6,743,765 B1 | 6/2004 | Dournel et al. |
| 6,858,571 B2 | 2/2005 | Pham et al. |
| 6,969,701 B2 * | 11/2005 | Singh .................. C09K 3/30 510/407 |
| 7,074,751 B2 * | 7/2006 | Singh .................. C11D 7/5063 510/408 |
| 7,230,146 B2 | 6/2007 | Merkel |
| 7,341,984 B2 * | 3/2008 | Wilson .................. C09K 5/045 510/408 |
| 7,413,674 B2 * | 8/2008 | Singh .................. C08J 9/144 252/2 |
| 2006/0033072 A1 | 2/2006 | Wilson et al. |

FOREIGN PATENT DOCUMENTS

| | | |
|---|---|---|
| EP | 0856571 | 8/1998 |
| EP | 974571 | 1/2000 |
| GB | 1587907 | 4/1981 |
| JP | 04323294 | 11/1992 |
| JP | 08277389 | 10/1996 |
| JP | 09059612 | 3/1997 |
| JP | 09111230 | 4/1997 |
| JP | 2000 309789 | 11/2000 |
| WO | 97/15637 | 5/1997 |
| WO | 99/48993 | 9/1999 |
| WO | 00/39242 | 7/2000 |
| WO | 02/20690 | 3/2002 |
| WO | 02/40613 | 5/2002 |
| WO | 2004/037913 | 5/2004 |
| WO | 2005/103187 | 11/2005 |
| WO | 2005/103190 | 11/2005 |
| WO | 2005/103191 | 11/2005 |
| WO | 2006/069362 | 6/2006 |

OTHER PUBLICATIONS

Saunders and Frisch, "Polyurethanes Chemistry and Technology," vols. I and II, John Wiley and Sons, New York, NY 1962. US.

Henne et al., "The Degradation of Silver Trifluoroacetate to Trifluoroiodomethane," JACS, vol. 72, 3806 (1950). US.

* cited by examiner

Capped EO/PO

- Lubricant
  - Methyl capped EO/PO
  - Ethyl capped EO/PO
- Additive
  - 0.75% Farnesene
  - 0.75% DP213
- Time of exposure
  - 3 days
- Conclusion so far
  - More stable than monocapped EO/PO version
  - Methyl less stable than ethyl
    - Might imply that larger caps provide more stability even for PO PAGs
    - Impurity affecting stability of methyl?

USE OF LOW GWP REFRIGERANTS COMPRISING CF$_3$I WITH STABLE LUBRICANTS

CROSS REFERENCE TO RELATED APPLICATION

This application is a continuation of U.S. patent application Ser. No. 11/937,267, now abandoned, filed Nov. 8, 2007, which claims the benefit of U.S. provisional patent application Ser. No. 60/865,659 filed on Nov. 14, 2006, each of which are incorporated herein by reference. This application is also a continuation-in-part of pending application Ser. No. 11/795,779, filed on Mar. 10, 2008, which is the U.S. national phase application of international application number PCT/US05/46982, filed Dec. 21, 2005, which claims priority to U.S. provisional patent application Ser. No. 60/638,003, filed on Dec. 21, 2004, the contents each of which is incorporated herein by reference.

BACKGROUND OF THE INVENTION

Field of the Invention

The present invention pertains to heat transfer compositions. More particularly the invention relates to automobile refrigerants comprising a hydrofluoroalkene, an iodocarbon, and at least one lubricant having hydrogen atoms and carbon atoms, wherein no more than 17% of the total number of hydrogen atoms which are attached to a carbon atom are tertiary hydrogen atoms.

Description of the Related Art

Compositions containing iodocarbon compounds have been disclosed as being particularly useful as heat transfer fluids. For example, international application PCT/US05/46982, filed Dec. 21, 2005, which is incorporated herein by reference, discloses compositions containing one or more fluoroolefins and the iodocarbon trifluoroiodomethane (CF$_3$I) for use as refrigerants in applications such as automotive air conditioning systems. One advantage of compositions comprising iodinated compounds, and in particular compositions comprising trifluoroiodomethane, is that such compositions may be used as replacements for various other chlorinated and/or fluorinated compounds which have previously been used widely in refrigeration applications but which have tended to cause potential environmental damage as a result of such use. However, iodinated compounds, such as trifluoroiodomethane, tend to be relatively unstable, and often significantly less stable than certain CFCs, HCFCs and HFCs, especially under conditions that tend to occur in heat transfer systems in general and in refrigeration/air conditioning systems in particular. Although compositions containing iodocarbons, and in particular CF$_3$I, can have substantial advantages when used in heat transfer applications, the use of such compositions presents heretofore unencountered and/or unrecognized problems. By way of example, compositions comprising iodocarbons, particularly compositions which comprise fluorinated olefins and iodocarbons, are frequently involved in a relatively complex chemical system under conditions of use, particularly as heat transfer fluids, that can cause unexpected results. In many typical heat transfer systems, such as automotive air conditioning systems, the refrigerant which comprises iodocarbon, such as CF$_3$I, results in such a compound being exposed to certain of the metallic components of the refrigeration system at temperatures and under other conditions which promote the formation of iodine, iodide ions, organic radicals, and iodine containing inorganic acids.

It has been proposed to utilize certain iodocarbon compounds in refrigeration applications as replacements for certain of the CFCs and HCFCs that have heretofore been used. For example, Japanese Kokai 09-059612 (Application No. 07-220964) discloses refrigerant compositions comprising trifluoroiodomethane and one or more phenolic compounds. This document indicates that the phenolic compounds act to stabilize the trifluoroiodomethane against degradation. While compositions containing stabilizers for trifluoroiodomethane may enjoy a certain degree of success the use of a stabilizing agent alone may leave several embodiments of such compositions practically ineffective for use in commercially acceptable heat transfer systems. Furthermore, the stabilizing agent can contribute to unwanted and/or undesirable reactions in heat transfer systems. Applicants have come to appreciate that the use of refrigerants containing iodocarbons in accordance with conventional techniques, and even the prior techniques described by some of the present inventors in the patent application indicated above, leaves the need in many embodiments for yet further improvements in the refrigerant compositions and/or the refrigeration system.

Applicants have surprisingly found that the present compositions are capable of achieving continued high levels of performance such as refrigeration capacity and low levels of ozone depletion and global warming. The inventive compositions minimize the decomposition of the refrigerant system by selecting a lubricant having a reduced amount of tertiary hydrogen atoms. Therefore, one aspect of the present invention involves compositions which are suitable for use as heat transfer compositions which comprise a hydrofluoroalkene, an iodocarbon, and at least one lubricant having hydrogen atoms and carbon atoms, wherein no more than 17% of the total number of hydrogen atoms which are attached to a carbon atom are tertiary hydrogen atoms.

DETAILED DESCRIPTION OF THE INVENTION

Figure 1:
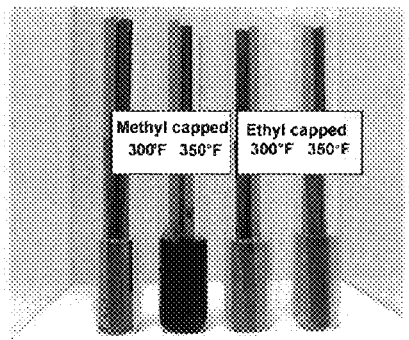
FIG. 1 illustrates the stability of capped EO/PO lubricants.

The invention provides a composition comprising a composition comprising a hydrofluoroalkene, an iodocarbon, and at least one lubricant having hydrogen atoms and carbon atoms, wherein no more than 17% of the total number of hydrogen atoms which are attached to a carbon atom are tertiary hydrogen atoms.

The composition first comprises a hydrofluoroalkene. Useful hydrofluoroalkene, especially for use in connection with heat transfer applications such as automotive air conditioning systems include C$_2$-C$_5$ hydrofluoroalkenes, preferably C$_2$-C$_4$ hydrofluoroalkenes, and more preferably C$_2$-C$_4$ hydrofluoroalkene with at least two, and preferably at least three fluorine substituents. Preferred among such hydrofluoroalkenes, are tetrafluoroalkenes and pentafluoroalkenes such as tetrafluoropropenes and pentafluoropropenes, particularly 1,1,1,2-tetrafluoropropene (HFO-1234yf); trans-1,3,3,3-tetrafluoropropene (trans-HFO-1234ze); 1,1,3,3,3-pentafluoropropene, (FIFO-12251c) and 1,2,3,3,3-pentafluoropropene (HFO-1225ye). In one embodiment, the composition comprises from about 60% to about 80% by weight of C$_2$-C$_4$ hydrofluoroalkene, and even more preferably from about 65% to about 75% of hydrofluoroalkene, based on the total weight of the composition.

The composition then contains an iodocarbon. Of particular use are $C_1$-$C_6$ idocarbons, preferably a $C_1$-$C_3$ iodofluorocarbon, and more preferably $C_1$-$C_2$ idocarbons. Preferably the iodocarbon comprises an iodofluorocarbon such as trifluoroiodomethane ($CF_3I$), that are surprisingly stable and can be used advantageously in a variety of applications, including as refrigerants in various cooling systems such as automobile air conditioning systems. In addition, not only are the present compositions sufficiently stable for a variety of uses, but also, they tend to exhibit a unique combination of non-flammability and low combined ozone-depletion and global warming properties, making them particularly useful candidates as CFC, HCFC, and HFC refrigerant replacements. Applicants have further recognized that the preferred compositions of the present invention are stable and suitable for use in many systems, apparatus and methods. For example, one aspect of the present invention provides systems, apparatus and methods that comprise the compositions of the present invention being included as a heating or cooling fluid (based on latent heat transfer and/or sensible heat transfer), such as in refrigeration applications, including particularly automotive air conditioning applications. Trifluoroiodomethane is readily available from a variety of commercial sources, including Matheson TriGas, Inc. In addition, trifluoroiodomethane prepared via any of a variety of conventional methods may be used. An example of one such conventional method of preparing trifluoroiodomethane is disclosed in JACS 72, 3806 (1950), "The Degradation of Silver Trifluoroacetate to Trifluoroiodomethane" by Albert L. Henne and William G. Finnegan, which is incorporated herein by reference.

In general, the iodocarbon compounds may be present in the compositions in widely ranging amounts, depending on numerous factors, including for example the particular intended conditions of use of the compound. In certain embodiments, the iodocarbon compound is usually present in the present composition in amounts, based on weight, of from about 10% to less than about 100%, preferably from about 20% to less than about 100%, more preferably from about 15% to about 50%, still more preferably from about 20% to about 40%, and even more preferably from about 25% to about 35%. In certain other embodiments, particularly those in which the composition contains a hydrofluorocarbon, the iodocarbon compounds is present in the present composition in amounts, based on weight, of from about 35% to about 95%, more preferably from about 45% to about 95%, and more preferably from about 65% to about 95%. In certain embodiments, the C1-C3 iodofluorcarbon compound is present in the composition in an amount of at least about 20% by weight, more preferably at least about 40% by weight, and even more preferably at least about 50% by weight.

The composition then contains a at least one lubricant having hydrogen atoms and carbon atoms, wherein no more than 17% of the total number of hydrogen atoms which are attached to a carbon atom are tertiary hydrogen atoms. Preferably the lubricant has less than 1% of the total number of hydrogen atoms which are attached to a carbon atom are tertiary hydrogen atoms, and more preferably has no tertiary hydrogen atoms, that is wherein about 0% of the total number of hydrogen atoms which are attached to a carbon atom are tertiary hydrogen atoms. It preferably also has a relatively low percentage of oxygen, and preferably no oxygen in the molecule. It is also generally preferred to use a lubricant or oil having little inherent concentration of polar solvent, particularly water. An important requirement for the lubricant is that there must be enough lubricant returning to the compressor of the system such that the compressor is lubricated. Thus suitability of the lubricant is determined partly by the refrigerant/lubricant characteristics and partly by the system characteristics. Examples of suitable lubricants include mineral oil, alkyl benzenes, including polyalkylene glycols, polyvinyl ethers (PVEs), and the like. Preferred lubricants include a naphthenic mineral oil, a paraffinic mineral oil, an ester oil, a polyalkylene glycol, a polyvinyl ether, an alkyl benzene, a polyalphaolefin, a polyester, a polyol ester, or combinations thereof. Mineral oil, which comprises paraffin oil or naphthenic oil, is commercially available. Commercially available mineral oils include Witco LP 250 (registered trademark) from Witco, Zerol 300 (registered trademark) from Shrieve Chemical, Sunisco 3GS from Witco, and Calumet R015 from Calumet. Commercially available alkyl benzene lubricants include Zerol 150 (registered trademark). Commercially available esters include neopentyl glycol dipelargonate, which is available as Emery 2917 (registered trademark) and Hatcol 2370 (registered trademark). Other useful esters include phosphate esters, dibasic acid esters, and fluoroesters. In some cases, hydrocarbon based oils are have sufficient solubility with the refrigerant that is comprised of an iodocarbon, the combination of the iodocarbon and the hydrocarbon oil might more stable than other types of lubricant. Such combination may therefore be advantageous. Preferred lubricants include polyalkylene glycols and esters. Polyalkylene glycols are highly preferred in certain embodiments because they are currently in use in particular applications such as mobile air-conditioning. Mixtures of different lubricants may be used.

In one aspect of the present invention involves a selection of a lubricant comprising in major proportion by weight, and even more preferably at least about 75% by weight of alkyl benzene-based compounds, mineral oil compounds, and combinations of these. With respect to alkyl benzene, applicants have found that such compounds are preferred from among the numerous other lubricant compounds which have heretofore been available due to the relatively high level of miscibility in the preferred refrigerant compositions and the relatively high level of stability that such molecules exhibit in the heat transfer compositions and the heat transfer systems of the present invention. Another preferred molecule for use in connection with the present invention is referred to herein, by way of convenience but not by way of limitation, as ethylene oxide/propylene oxide (EO/PO) molecules. Such molecules in preferred embodiments have the structure indicated below:

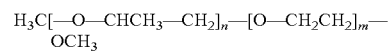

Applicants have found that such EO/PO molecules, which are also referred to herein as "dual capped EO/PO molecules" due to the presence of the methyl radical on each end of the molecule, or alternatively other relatively low chain length alkyl group" can provide the ability to adjust, to suit each particular application, the n and the m values. In this way, a lubricant molecule can be selected to achieve a highly advantageous combination of miscibility and stability. An advantage that dual capped molecules perform substantially better in many respects and similar molecules which are only capped at one end, as illustrated in the examples below. U.S. Pat. No. 4,975,212, which is incorporated herein by reference, discloses techniques for capping molecules of this type. Although it is not generally preferred, is also possible to combine the preferred lubricants of the present invention with one or more conventional lubricants.

Suitable polyol ester lubricants suitable for air conditioning or refrigeration use are typically prepared by the condensation of a poly alcohol or polyol compound such as pentaerythritol, dipentaerythritol, neopentyl glycol or trimethylpropanol with either pure or mixed, linear or branched aliphatic carboxylic acids such as a linear or branched monocarboxylic acid having from about 4 to about 10 carbon atoms. Polyol ester base stocks polyols are available from Hatco Corporation. For example Hatcol 3307 is a pure polyol ester basestock based on neopentyl glycol. Hatcol 3329 and Hatcol 3504 are a pure polyol ester refrigeration base stocks based on pentaerythritol mixed fatty acids esters. Hatcol 3316 is a polyol ester of dipentaerythritol and short chain fatty acids. Other examples of such polyol ester lubricant formulations include the Cognis ProEco™ line of Polyol ester refrigeration lubricants, ICI's EMKARATE RL line of polyol esters, as well as polyol ester lubricants provided by Lubrizol subsidiary CPI Engineering Services, Inc. such as Solest. Preferred compositions according to the invention, include a lubricant in amounts of from about 20 wt. % to about 50 wt. %, preferably from about 20 wt. % to about 30 wt. % by weight of the composition.

The present compositions may include additionally stabilizers, such as but not limited to phenols, epoxides, phosphites and phosphates, and combinations of these, which are disclosed in co-pending U.S. patent application Ser. No. 11/109,575 filed Apr. 18, 2005, which is incorporated herein by reference. Among the epoxides, aromatic epoxides and fluorinated alkyl epoxides are preferred additional stabilizers.

It is contemplated that any of a variety of phenol compounds are suitable for use as optional stabilizer in the present compositions. While applicants do not wish to be bound by or to any theory of operation, it is believed that the present phenols act as radical scavengers in the present compositions and thereby tend to increase the stability of such compositions. As used herein the term "phenol compound" refers generally to any substituted or unsubstituted phenol. Examples of suitable phenol compounds include 4,4'-methylenebis(2,6-di-tert-butylphenol); 4,4'-bis(2,6-di-tert-butylphenol); 2,2- or 4,4-biphenyldiols including 4,4'-bis(2-methyl-6-tert-butylphenol); derivatives of 2,2- or 4,4-biphenyldiols; 2,2'-methylenebis(4-ethyl-6-tertbutylphenol); 2,2'-methylenebis(4-methyl-6-tert-butylphenol); 4,4,-butylidenebis(3-methyl-6-tert-butylphenol); 4,4,-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol; 2,4-dimethyl-6-tert-butylphenol; 2,6-di-tert-.alpha.-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; and bis(3,5-di-tert-butyl-4-hydroxybenzyl)sulfide; and the like. Other suitable phenols include tocopherol, hydroquinone; t-butyl hydroquinone; and other derivatives of hydroquinone; and the like. Certain preferred phenols include tocopherol, BHT, hydroquinone and the like. Certain particularly preferred phenols include tocopherol and the like. Most phenols are commercially available such as the Irganox compounds from Ciba. A single phenol compound and/or mixtures of two or more phenols may be used in the present compositions.

It is also contemplated that any of a variety of epoxides are suitable for use in the compositions of the present invention. While applicants do not wish to be bound by or to any theory of operation, it is believed that the epoxides of the present invention act as acid scavengers in the $CF_3I$ compositions and thereby tend to increase the stability of such compositions. Examples of suitable aromatic epoxides include those defined by the Formula I below:

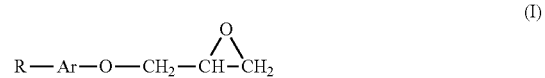
(I)

wherein: R is hydrogen, alkyl, fluoroalkyl, aryl, fluoroaryl, or

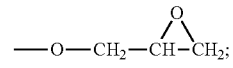

and

Ar is a substituted or unsubstituted phenylene or naphthylene moiety. Certain preferred aromatic epoxides of Formula I include: butylphenylglycidyl ether; pentylphenylglycidyl ether; hexylphenylglycidyl ether; heptylphenylglycidyl ether; octylphenylglycidyl ether; nonylphenylglycidyl ether; decylphenylglycidyl ether; glycidyl methyl phenyl ether; 1,4-diglycidyl phenyl diether and derivatives thereof; 1,4-diglycidyl naphthyl diether and derivatives thereof; and 2,2'[[[5-heptadecafluorooctyl]1,3phenylene]bis[[2,2,2trifluoromethyl]ethylidene]oxymethylene]bisoxirane; and the like. Other preferred aromatic epoxides include naphthyl glycidyl ether, 4-methoxyphenyl glycidyl ether, and derivatives of naphthyl glycidyl ether; and the like. Certain more preferred aromatic epoxides include butylphenyl glycidyl ether, and the like. A single aromatic epoxide and/or mixtures of two or more aromatic epoxides may be used in the present compositions.

Any of a variety of alkyl and/or alkenyl epoxides is suitable for use in the present compositions. Examples of suitable alkyl and alkenyl epoxides include those of Formula II:

(II)

wherein $R_{alk}$ is a substituted or unsubstituted alkyl or alkenyl group. Preferably, $R_{alk}$ is a substituted or unsubstituted alkyl or alkenyl group having from about 1 to about 10 carbon atoms, more preferably from about 1 to about 6 carbon atoms. Certain preferred alkyl epoxides of Formula II include n-butyl glycidyl ether, isobutyl glycidyl ether, hexanediol diglycidyl ether, and the like, as well as, fluorinated and perfluorinated alkyl epoxides. More preferred alkyl epoxides include hexanediol diglycidyl ether. Certain preferred alkenyl epoxides of Formula II include allyl glycidyl ether, fluorinated and perfluorinated alkenyl epoxides, and the like. More preferred alkenyl epoxides include allyl glycidyl ether and the like.

It is contemplated that the composition may optionally contain additional components. These may include:
$CO_2$ Hydrocarbons (substituted and un-substituted, particularly $C_2$-$C_6$ hydrocarbons);
Alcohols (substituted and un-substituted, particularly $C_2$-$C_6$ alcohols);
Ketones (substituted and un-substituted, particularly $C_2$-$C_5$ ketones);
Aldehydes (substituted and un-substituted, particularly $C_2$-$C_5$ aldehydes);
Ethers/Diethers (substituted and un-substituted, particularly $C_2$-$C_5$ ethers);
Fluoroethers (substituted and un-substituted, particularly $C_2$-$C_5$ fluoroethers);
Fluoroalkenes (substituted and un-substituted, particularly $C_2$-$C_6$ fluoroalkenes);
HFC (particularly $C_2$-$C_5$ HFCs);
HCC (particularly $C_2$-$C_5$ HCCs);
Haloalkenes, including preferably fluoroalkenes (substituted and un-substituted, particularly $C_2$-$C_6$ fluoroalkenes);
HFO (particularly $C_2$-$C_5$ HFOs);
HClFO (particularly $C_2$-$C_5$HClFOs);
HBrFO (particularly $C_2$-$C_5$ HBrFOs).

The composition may optionally further comprises one or more hydrofluorocarbons. Preferred hydrofluorocarbons comprise a $C_1$-$C_4$ hydrofluorocarbon, preferably $C_1$-$C_3$ hydrofluorocarbon, and even more preferably $C_1$-$C_2$ hydrofluorocarbon. Preferred hydrofluorocarbons include hydrofluoroalkane such as pentafluoroethane, 1,1,1,2-tetrafluoroethane, trifluorethane or combinations thereof. When a hydrofluorocarbon is employed It is preferably present in the overall composition in an amount of from about 1% to about 50% and more preferably from about 5% to about 35% of hydrofluorocarbon, based on the total weight of the composition.

As used herein, the term "HFO" means compounds that consist of atoms of carbon, fluorine and hydrogen, and no other atoms, and in which there is at least one carbon-carbon double bond; the term "HClFO" means compounds that consist of atoms of carbon, chlorine, fluorine and hydrogen, and no other atoms, and in which there is at least one carbon-carbon double bond; the term "HBrFO" means compounds that consist of atoms of carbon, bromine, fluorine and hydrogen, and no other atoms, and in which there is at least one carbon-carbon double bond; the designations $C_2$-$C_5$ and like usages, refer to compounds having at least one carbon atom and up to about five carbon atoms, etc. While it is contemplated that a wide variety of HFCs may be used in the present compositions and methods, in certain embodiments it is preferred to use in the compositions one or more of the following, including any and all isomers of each: difluoromethane (HFC-32); pentafluoroethane (HFC-125); 1,1,2,2-tetrafluoroethane (HFC-134); 1,1,1,2-tetrafluoroethane (HFC-134a); trifluorethane (HFC-143a); difluoroethane (HFC-152a); 1,1,1,2,3,3,3-heptafluoropropane (HFC-227ea); 1,1,1,3,3,3-hexafluoropropane (HFC-236fa); 1,1,1,3,3-pentafluoropropane (HFC-245fa); and 1,1,1,3,3-pentafluorobutane (HFC-365mfc). While it is contemplated that a wide variety of fluoroalkenes may be used in the present compositions and methods, it is particularly preferred in many embodiments that the compositions comprise one or more $C_3$ or $C_4$ fluoroalkenes, preferably compounds having the formula as follows:

$$XCF_zR_{3-z}$$

where X is a $C_2$ or a $C_3$ unsaturated, substituted or unsubstituted, alkyl radical, each R is independently Cl, F, Br, I or H, and z is 1 to 3. Highly preferred among are the following compounds: fluoroethenes, fluorpropenes; fluorobutenes; chlorofluorethenes; chlorofluoropropenes; and chlorofluorobutenes.

The composition then optionally contains a compound comprising trifluoromethane, methyl iodide, heptafluorobutane or propene. The latter is usually present in an amount of from greater than zero to about 1% by weight of the composition, more usually from about 0.01% to about 1% by weight of the composition.

Many existing refrigeration systems are currently adapted for use in connection with existing refrigerants, and certain compositions of the present invention are believed to be adaptable for use in many of such systems, either with or without system modification. In many applications the compositions of the present invention may provide an advantage as a replacement in systems, which are currently based on refrigerants having a relatively high capacity. Furthermore, in embodiments where it is desired to use a lower capacity refrigerant composition of the present invention, for reasons of cost for example, to replace a refrigerant of higher capacity, such embodiments of the present compositions provide a potential advantage. Thus, it is preferred in certain embodiments to use compositions of the present invention, particularly compositions comprising a substantial proportion of, and in some embodiments comprising a major proportion of HFO-1234yf, as a replacement for existing refrigerants, such as HFC-134a. In certain applications, the refrigerants of the present invention potentially permit the beneficial use of larger displacement compressors, thereby resulting in better energy efficiency than other refrigerants, such as HFC-134a. Therefore the refrigerant compositions of the present invention, particularly compositions comprising HFO-1234yf, provide the possibility of achieving a competitive advantage on an energy basis for refrigerant replacement applications.

The present methods, systems and compositions are thus adaptable for use in connection with automotive air conditioning systems and devices, commercial refrigeration systems and devices, chillers, residential refrigerator and freezers, general air conditioning systems, heat pumps, ORCs, CRCs and the like.

The compositions of the present invention are useful in connection with numerous methods and systems, including as heat transfer fluids in methods and systems for transferring heat, such as refrigerants used in refrigeration, air conditioning and heat pump systems. The preferred heat transfer methods generally comprise providing a composition of the present invention and causing heat to be transferred to or from the composition, preferably by changing the phase of the composition and/or by sensible heat transfer. For example, the present methods provide cooling by absorbing heat from a fluid or article, preferably by evaporating the present refrigerant composition in the vicinity of the body or fluid to be cooled to produce vapor comprising the present composition. Preferably the methods include the further step of compressing the refrigerant vapor, usually with a compressor or similar equipment to produce vapor of the present composition at a relatively elevated pressure. Generally, the step of compressing the vapor results in the addition of heat to the vapor, thus causing an increase in the temperature of the relatively high pressure vapor. Preferably, the present methods include removing from this relatively high temperature, high pressure vapor at least a portion of the heat added by the evaporation and compression steps. The heat removal step preferably includes condensing the high temperature, high pressure vapor while the vapor is in a relatively high pressure condition to produce a relatively high pressure liquid comprising a composition of the present invention. This relatively high pressure liquid preferably then undergoes a nominally isoenthalpic reduction in pressure to produce a relatively low temperature, low pressure liquid. In such embodiments, it is this reduced temperature refrigerant liquid which is then vaporized by heat transferred from the body or fluid to be cooled. In another process embodiment of the invention, the compositions of the invention may be used in a method for producing heating which comprises condensing a refrigerant comprising the compositions in the vicinity of a liquid or body to be heated. Such methods, as mentioned hereinbefore, frequently are reverse cycles to the refrigeration cycle described above.

In preferred embodiments, the present compositions have a Global Warming Potential (GWP) of not greater than about 1000, more preferably not greater than about 500, and even more preferably not greater than about 150, and in certain cases of not greater than about 100. In certain embodiments, the GWP of the present compositions is not greater than about 75. As used herein, "GWP" is measured relative to that of carbon dioxide and over a 100-year time horizon, as defined in "The Scientific Assessment of Ozone Depletion, 2002, a report of the World Meteorological Association's Global Ozone Research and Monitoring Project," which is incorporated herein by reference. The compositions preferably also having an Ozone Depleting Potential (ODP) of not greater than about 0.05, more preferably not greater than about 0.02 and even more preferably about zero. As used herein, "ODP" is as defined in "The Scientific Assessment of Ozone Depletion, 2002, A report of the World Meteorological Association's Global Ozone Research and Monitoring Project," which is incorporated herein by reference.

The invention also provides a heat transfer system comprising:
(a) a heat transfer composition comprising the above composition; and
(b) one or more vessels containing and/or in contact with at least a portion of the heat transfer composition. The invention also contemplates a method of transferring heat to or from a fluid or body comprising contacting the fluid or body with a heat transfer composition comprising the above composition.

The invention further contemplates a method of replacing an existing refrigerant contained in a refrigerant system comprising replacing at least a portion of said existing refrigerant from said system and replacing at least a portion of said existing refrigerant by introducing into said system a refrigerant composition comprising the above composition.

The following non-limiting example serves to illustrate the invention.

Example 1

A standard test used by the industry for evaluation of thermal stability of refrigeration systems is the Sealed Tube Stability Test (ASHRAE 97-99). In this test, refrigerant and lubricant, typically in the weight ratio of 1:1, are sealed into an evacuated glass tube containing samples of selected metals, copper, steel, and aluminum immersed in the liquid. The tube is then maintained at 175° C. for 14 days, cooled, and the contents removed for analysis. The refrigerant is analyzed by gas chromatography for degradation; the lubricating oil is analyzed for changes in total acid number, TAN, and the presence of metals and halide ions; and the metal samples are evaluated for corrosion. This accelerated test simulates the interaction between the lubricant and the refrigerant in the presence of the mixed metals of construction. A good refrigeration lubricant will not cause degradation of the refrigerant or corrosion of the metals.

Three lubricants with different amounts of tertiary hydrogens, PAG ~17 wt % the other two ~<5%, were sealed in glass tubes according to the procedure outlined in ASHRAE 97-99. After exposure they were analyzed and the results are in Table 1.

TABLE 1

Lubricants with different amounts of tertiary hydrogens

| Property | "Di-capped" PAG | Mineral Oil | Alkyl Benzene |
|---|---|---|---|
| Change in TAN | 13.7 | 0.4 | 0.2 |
| Iodide (ppm) | 2020 | <5 | <5 |
| Fluoride (ppm) | 2801 | 7.0 | 3.7 |
| Color | Dark | Clear | Very Pale Yellow |

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A heat transfer composition comprising: (a) a refrigerant comprising: (i) at least a first compound selected from at least one of 2,3,3,3-tetrafluoropropene, trans-1,3,3,3-tetrafluoropropene and HFC-32; and (ii) at least about 40% by weight of $CF_3I$; (b) lubricant; and (c) a stabilizer.

2. The composition of claim 1 wherein said at least a first compound comprises 2,3,3,3-tetrafluoropropene.

3. The composition of claim 1 wherein said at least a first compound comprises trans-1,3,3,3-tetrafluoropropene.

4. A mobile air conditioning system comprising the heat transfer composition of claim 1.

5. A heat transfer system comprising the heat transfer composition of claim 1.

6. A method of transferring heat to or from a fluid or body comprising contacting the fluid or body with the heat transfer composition of claim 1.

7. A heat transfer composition comprising: (a) a refrigerant comprising: (i) at least a first compound selected from at least one of 2,3,3,3-tetrafluoropropene, trans-1,3,3,3-tetrafluoropropene and HFC-32; and (ii) at least about 25% by weight of $CF_3I$; (b) lubricant; and (c) a stabilizer.

8. The composition of claim 7 wherein said at least a first compound comprises 2,3,3,3-tetrafluoropropene.

9. The composition of claim 7 wherein said at least a first compound comprises trans-1,3,3,3-tetrafluoropropene.

10. A mobile air conditioning system comprising the heat transfer composition of claim 7.

11. A heat transfer system comprising the heat transfer composition of claim 7.

12. A method of transferring heat to or from a fluid or body comprising contacting the fluid or body with the heat transfer composition of claim 7.

13. A heat transfer composition comprising: (a) a refrigerant comprising: (i) at least a first compound selected from at least one of 2,3,3,3-tetrafluoropropene, trans-1,3,3,3-tetrafluoropropene and HFC-32; and (ii) at least about 50% by weight of $CF_3I$; (b) lubricant; and (c) a stabilizer.

14. The composition of claim 13 wherein said at least a first compound comprises 2,3,3,3-tetrafluoropropene.

15. The composition of claim 13 wherein said at least a first compound comprises trans-1,3,3,3-tetrafluoropropene.

16. A mobile air conditioning system comprising the heat transfer composition of claim 13.

17. A heat transfer system comprising the heat transfer composition of claim 13.

18. A method of transferring heat to or from a fluid or body comprising contacting the fluid or body with the heat transfer composition of claim 13.

* * * * *